UNITED STATES PATENT OFFICE.

FRANK ORTH, OF INDIANA HARBOR, INDIANA.

PIGMENT.

1,161,790.　　Specification of Letters Patent.　Patented Nov. 23, 1915.

No Drawing.　Application filed March 18, 1912.　Serial No. 684,615.

*To all whom it may concern:*

Be it known that I, FRANK ORTH, a citizen of the United States, residing at Indiana Harbor, in the county of Lake and State of Indiana, have invented certain new and useful Improvements in Pigments, of which the following is a specification.

This invention relates to pigments made from a by-product of blast furnaces termed flue dust, which is generally wasted and is consequently inexpensive besides having a permanent color.

In the operation of blast furnaces, there are large quantities of fine particles of material that are carried, by the air blast and gases, out of the ore stock when the same is periodically charged into the top of the furnaces. The accumulation of this material which is known as flue dust is a nuisance, and its disposition and removal is an expense. It is the essential object of the present invention to utilize this waste furnace product, as hereinafter set forth.

In charging a blast furnace, iron ore, coke and lime are introduced into the same, and the air blast carries away an appreciable amount of the fine particles of these materials, the major constituents of which comprise oxid of manganese, oxid of iron, oxid of aluminum, silicon dioxid, and carbon, along with small quantities of lime and coke. The amount of this furnace flue dust which is discharged by and with the air blast depends considerably upon the fineness of the stock composing the furnace charge together with the fineness of the ore, coke, and other materials, the ratio of which will vary at different times to a limited extent.

In practising the present invention, I prefer to take the accumulation of flue dust from 12 to 24 hours of furnace run and thoroughly mix the same in order to secure a practically uniform color and composition of the material. The natural color of the pigment may be determined principally by the color of the metallic oxid composing the furnace charge together with the percentage of carbon carried over by the blast, and said color may range from different shades of brown to dark red, or otherwise. A sufficient amount of the furnace flue dust having been accumulated, it is then subjected to a pulverizing or grinding operation for reducing the particles to a proper degree or standard of fineness to render the same practical for commercial usage. In making an improved pigment for a mortar color, it may be finely pulverized or ground by being passed through a tube mill, or other suitable device, the respective pigment particles being of the requisite degree of fineness and uniformity to permit of their being readily used as a mortar color and for coloring clay, sand, lime, brick and cement.

It has been found that this improved pigment is especially efficient and durable, since it has been subjected to a high degree of heat which absolutely insures its chemical stability and renders it most durable and impervious to atmospheric conditions as well as being water and fire proof. Furthermore, as this pigment has a mineral base, it will resist the corroding action of lime, cement and other materials of a like nature.

The following is a sample analysis of brown blast furnace flue dust:

| | |
|---|---|
| Silicon dioxid | 10.50 |
| Calcium oxid | 1.21 |
| Magnesium oxid | Trace. |
| Iron oxid | 69.60 |
| Manganese | 7.65 |
| Aluminum oxid | Trace. |
| Carbon as coke | 8.05 |
| Moisture | 3.00 |
| | 100.00 |

From above it will be seen that between 3 and 4% is carried away or lost in the form of moisture, etc. Obviously, the constituents of the flue dust would vary somewhat depending upon the mineral properties and characteristics of the ore. Some of the mineral elements may be separated from the furnace dust, either before or after grinding or pulverizing, depending upon the exact pigment to be produced.

The flue dust has a basic chemical reaction, by reason of the essentially basic character or quality of its main constituent. Such building materials as lime, cement, mortar, brick, etc., as well as many others which are generally used, are also chemically basic in character. Inasmuch as the flue dust and the building materials both have basic characteristics, it follows that the flue dust is admirably adapted for use as a pigment or coloring matter for building materials. In addition to its desirability from the standpoint of its basic characteristics, the flue dust is also desirable for use as a pigment for coloring building materials for the reason that, when it leaves the furnace, it has been subjected to a fairly high degree of heat, and, therefore, its chemical properties are substantially fixed as far as any change at ordinary temperatures is concerned. Also the material is substantially insoluble in water, and, therefore, will not wash out or dissolve out from a building material which is subjected to the weather.

I claim:

As a new article of manufacture a pigment formed from blast furnace flue dust by thoroughly mixing a flue dust accumulation from a period of several hours run, to secure uniformity of color and composition, and which has been thereafter finely pulverized for the purpose of securing uniformity of fineness of the material.

FRANK ORTH.

Witnesses:
WALKER BANNING,
MARY R. FROST.